(12) United States Patent
Ollila

(10) Patent No.: US 11,119,313 B1
(45) Date of Patent: Sep. 14, 2021

(54) IMAGING SYSTEMS AND METHODS FOR EXPANDING FIELD OF VIEW OF CAPTURED IMAGES

(71) Applicant: Varjo Technologies Oy, Helsinki (FI)

(72) Inventor: Mikko Ollila, Tampere (FI)

(73) Assignee: Varjo Technologies Oy, Helsinki (FI)

(*) Notice: Subject to any disclaimer, the term of this patent is extended or adjusted under 35 U.S.C. 154(b) by 0 days.

(21) Appl. No.: 16/944,637

(22) Filed: Jul. 31, 2020

(51) Int. Cl.
  G02B 27/00 (2006.01)
  G06T 7/70 (2017.01)
  G06T 19/00 (2011.01)
  G02B 27/01 (2006.01)
  G06T 7/73 (2017.01)

(52) U.S. Cl.
  CPC ..... *G02B 27/0093* (2013.01); *G02B 27/0101* (2013.01); *G02B 27/0179* (2013.01); *G06T 7/74* (2017.01); *G06T 19/006* (2013.01); *G02B 2027/0123* (2013.01); *G02B 2027/0138* (2013.01); *G02B 2027/0187* (2013.01); *G06T 2207/20132* (2013.01)

(58) Field of Classification Search
  CPC ............ G02B 27/0093; G02B 27/0101; G02B 27/0179; G06T 7/74; G06T 19/006
  USPC ...................................................... 345/633
  See application file for complete search history.

(56) References Cited

U.S. PATENT DOCUMENTS

| 10,152,775 | B1* | 12/2018 | Bellows | G06T 1/20 |
| 2006/0274170 | A1* | 12/2006 | Azuma | H04N 5/3572 348/246 |
| 2007/0268316 | A1* | 11/2007 | Kajita | G02B 27/017 345/642 |
| 2008/0129756 | A1* | 6/2008 | Iwano | G06T 3/0025 345/632 |
| 2018/0061086 | A1* | 3/2018 | Yoshimura | H04N 5/23229 |

* cited by examiner

*Primary Examiner* — Hai Tao Sun
(74) *Attorney, Agent, or Firm* — Ziegler IP Law Group, LLC

(57) ABSTRACT

An imaging system for producing extended-reality images for a display apparatus. The imaging system including camera that is employed to capture input image representing captured region of real-world environment; and processor configured to: generate intermediate image by correcting spatial distortion of input image; determine capturing region of intermediate image representing captured region of real-world environment and non-capturing regions of intermediate image corresponding to non-captured regions of real-world environment; generate image data for non-capturing region of intermediate image, based on at least one of: information pertaining to virtual object that is to be virtually superimposed, capturing region neighbouring non-capturing region, previous extended-reality image, photogrammetric model of real-world environment; and process intermediate image, based on generated image data, to produce extended-reality image to be presented at display apparatus.

16 Claims, 5 Drawing Sheets

IMAGING SYSTEMS AND METHODS FOR EXPANDING FIELD OF VIEW OF CAPTURED IMAGES

TECHNICAL FIELD

The present disclosure relates generally to imaging systems; and more specifically, to imaging system for producing extended-reality images for display apparatuses. The present disclosure also relates to methods for producing extended-reality images for display apparatuses.

BACKGROUND

Immersive technologies such as virtual-reality, augmented-reality, mixed-reality (sometimes, collectively referred to as extended-reality technology) are being employed in various fields such as entertainment, real estate, training, medical imaging operations, simulators, navigation, and the like. Such immersive technologies create immersive extended-reality environments.

In order to produce extended-reality images (for example, such as, virtual-reality images, augmented-reality images, mixed-reality images), a display apparatus employs an imaging system for capturing images of a real-world environment. Existing imaging systems employ one or more cameras for capturing images of the real-world environment. Such cameras could be equipped with any type of lenses such as, fish-eye lenses, rectilinear lenses, and the like. The extended-reality images are rendered at one or more image renderers of the display apparatus. Notably, the one or more image renderers have specific angular size of fields of view. When multiple image renderers are used, they collectively provide a stereo field of view.

However, existing imaging systems suffer from several limitations. In an example, the lenses may introduce distortion in captured images of the real-world environment such as, barrel distortion, pincushion distortion, and the like. In another example, in order to maximize angular resolution (namely, pixels per degree) of the captured images, a field of view of the one or more cameras is made narrower than the stereo field of view. In other words, the field of view of the one or more cameras is lowered. In such a case, the generated extended-reality images also have a smaller field of view than the stereo field of view, and are therefore sub-optimally rendered at the one or more image renderers. This leads to an experience involving lack of realism, lack of immersion, and abstractedness when a user views the extended-reality environment.

Therefore, in light of the foregoing discussion, there exists a need to overcome the aforementioned drawbacks associated with the existing imaging systems.

SUMMARY

The present disclosure seeks to provide an imaging system for producing extended-reality images for a display apparatus. The present disclosure also seeks to provide a method for producing extended-reality images for a display apparatus. The present disclosure seeks to provide a solution to the existing problems of distortions in and suboptimal field of field of view of extended-reality images produced by existing imaging systems. An aim of the present disclosure is to provide a solution that overcomes at least partially the problems encountered in prior art, and provides, realistic, optimally-sized, high-resolution extended-reality images for a display apparatus.

In one aspect, an embodiment of the present disclosure provides an imaging system for producing extended-reality images for a display apparatus, the imaging system comprising:
at least one camera that is employed to capture at least one input image, the at least one input image representing a captured region of a real-world environment; and
at least one processor configured to:
generate at least one intermediate image by correcting a spatial distortion of the at least one input image;
determine a capturing region of a given intermediate image that represents the captured region of the real-world environment and a plurality of non-capturing regions of the given intermediate image that correspond respectively to a plurality of non-captured regions of the real-world environment neighboring the captured region of the real-world environment;
generate image data for a given non-capturing region of the given intermediate image, based on at least one of: information pertaining to a virtual object that is to be virtually superimposed over at least a portion of the given non-capturing region, a portion of the capturing region neighbouring the given non-capturing region, at least one previous extended-reality image, a photogrammetric model of the real-world environment; and
process the given intermediate image, based on the generated image data, to produce a given extended-reality image to be presented at the display apparatus.

In another aspect, an embodiment of the present disclosure provides a method for producing extended-reality images for a display apparatus, the method comprising:
capturing, via at least one camera, at least one input image representing a captured region of a real-world environment;
generating at least one intermediate image by correcting a spatial distortion of the at least one input image;
determining a capturing region of a given intermediate image that represents the captured region of the real-world environment and a plurality of non-capturing regions of the given intermediate image that correspond respectively to a plurality of non-captured regions of the real-world environment neighboring the captured region of the real-world environment;
generating image data for a given non-capturing region of the given intermediate image, based on at least one of: information pertaining to a virtual object that is to be virtually superimposed over at least a portion of the given non-capturing region, a portion of the capturing region neighbouring the given non-capturing region, at least one previous extended-reality image, a photogrammetric model of the real-world environment; and
processing the given intermediate image, based on the generated image data, to produce a given extended-reality image to be presented at the display apparatus.

Embodiments of the present disclosure substantially eliminate or at least partially address the aforementioned problems in the prior art, and enable production of realistic, optimally-sized, high-resolution extended-reality images for a display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 4A illustrates fields of view providable by image renderers corresponding to a left eye and a right eye, while

FIG. 5C illustrates a tertiary intermediate image, while

Figure 1:
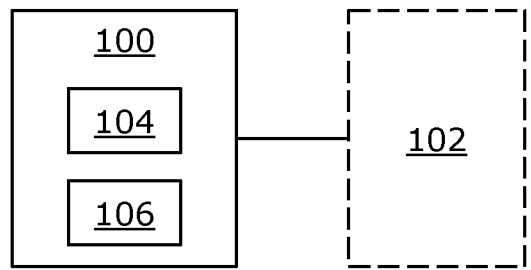
FIGS. 1 and 2 illustrate block diagrams of architectures of an imaging system, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an imaging system for producing extended-reality images for a display apparatus, the imaging system comprising:
at least one camera that is employed to capture at least one input image, the at least one input image representing a captured region of a real-world environment; and
at least one processor configured to:
generate at least one intermediate image by correcting a spatial distortion of the at least one input image;
determine a capturing region of a given intermediate image that represents the captured region of the real-world environment and a plurality of non-capturing regions of the given intermediate image that correspond respectively to a plurality of non-captured regions of the real-world environment neighboring the captured region of the real-world environment;
generate image data for a given non-capturing region of the given intermediate image, based on at least one of: information pertaining to a virtual object that is to be virtually superimposed over at least a portion of the given non-capturing region, a portion of the capturing region neighbouring the given non-capturing region, at least one previous extended-reality image, a photogrammetric model of the real-world environment; and
process the given intermediate image, based on the generated image data, to produce a given extended-reality image to be presented at the display apparatus.

In another aspect, an embodiment of the present disclosure provides a method for producing extended-reality images for a display apparatus, the method comprising:
capturing, via at least one camera, at least one input image representing a captured region of a real-world environment;
generating at least one intermediate image by correcting a spatial distortion of the at least one input image;
determining a capturing region of a given intermediate image that represents the captured region of the real-world environment and a plurality of non-capturing regions of the given intermediate image that correspond respectively to a plurality of non-captured regions of the real-world environment neighboring the captured region of the real-world environment;
generating image data for a given non-capturing region of the given intermediate image, based on at least one of: information pertaining to a virtual object that is to be virtually superimposed over at least a portion of the given non-capturing region, a portion of the capturing region neighbouring the given non-capturing region, at least one previous extended-reality image, a photogrammetric model of the real-world environment; and
processing the given intermediate image, based on the generated image data, to produce a given extended-reality image to be presented at the display apparatus.

The present disclosure provides the aforementioned imaging system and the aforementioned method for producing extended-reality images for a display apparatus. Herein, a field of view of at least one camera is optimized to obtain a higher resolution, so the at least one input image captured by the at least one camera is spatially distorted. However, the at least one intermediate image is efficiently generated by correcting spatial distortion of the at least one input image. Moreover, the plurality of non-capturing regions (namely, regions having missing visual information on account of not being imaged by the at least one camera) in the given intermediate image are accurately inpainted (namely, reconstructed based on generated image data) to increase a field of view of the given extended-reality image. Generating the image data for the plurality of non-capturing regions and applying the image data to the plurality of non-capturing regions is performed in real time or near-real time. Moreover, said inpainting is done in a manner that a field of view of the given extended-reality image is equal to or greater than an angular extent of a field of view of at least one image renderer of the display apparatus. As a result, the given extended-reality image is optimally rendered at the at least one image renderer. Therefore, when a user of the display apparatus views the given extended-reality image, the user experiences realism and immersiveness within an extended-reality environment. In this manner, the present disclosure provides an imaging system and method that is capable of producing, realistic, optimally-sized, high-resolution extended-reality images for a display apparatus.

Throughout the present disclosure, the term "imaging system" refers to specialized equipment for capturing the at least one input image of the real-world environment. The at least one input image is processed to gather information about the real-world environment, which is then used to produce extended-reality (XR) images for the display apparatus. The XR images are to be presented to a user of the display apparatus. It will be appreciated that the term "at least one input image" refers to "one input image" in some implementations, and "a plurality of input images" in other implementations.

It will be appreciated that the aforesaid system and the aforesaid method are not limited to producing only a single XR image for the display apparatus, and can be employed to produce a sequence of XR images constituting a visual scene of an XR environment. In such a case, the image processing steps described herein are performed for each input image of a sequence of input images, to produce the sequence of XR images. The sequence of XR images are produced in real time or near-real time.

Herein, the term "extended-reality" encompasses virtual-reality (VR), augmented-reality (AR), mixed-reality (MR), and the like. In one embodiment, the XR images are VR images. The VR images, when displayed, present a visual scene of a VR environment to the user. In an example, the visual scene may be a VR movie. In another embodiment, the XR images are AR images. The AR images, when displayed, present a visual scene of an AR environment to the user. In an example, the visual scene may be an educational AR video. In yet another embodiment, the XR images are MR images. The MR images, when displayed, present a visual scene of a MR environment to the user. In an example, the visual scene may be a MR high visual fidelity game.

Throughout the present disclosure, the term "display apparatus" refers to a specialized equipment that is configured to present an XR environment to the user when the display apparatus in operation is worn by the user on his/her head. In such an instance, the display apparatus acts as a device (for example, such as an XR headset, a pair of XR glasses, and the like) that is operable to present a visual scene of the XR environment to the user. The visual scene of the XR environment comprises a sequence of XR images. Commonly, the "display apparatus" is referred to as "head-mounted display apparatus", for the sake of convenience only.

In some implementations, the imaging system is integrated with the display apparatus. In such implementations, the imaging system is physically coupled to the display apparatus (for example, attached via mechanical and electrical connections to components of the display apparatus). Optionally, in such implementations, the at least one processor of the imaging system serves as a processor of the display apparatus. Alternatively, optionally, in such implementations, the at least one processor of the imaging system is communicably coupled to a processor of the display apparatus.

In other implementations, the imaging system is implemented on a remote device that is separate from the display apparatus. In such implementations, the at least one processor and a processor of the display apparatus are communicably coupled via a wired communication interface, a wireless communication interface, or a combination of both. Optionally, the imaging system is mounted on the remote device. Examples of the remote device include, but are not limited to, a drone, a vehicle, and a robot. Optionally, in such an instance, the remote device is physically positioned at the real-world environment, whereas the user of the display apparatus is positioned away from (for example, at a distance from) the remote device.

Optionally, the display apparatus comprises at least one image renderer. Throughout the present disclosure, the term "image renderer" refers to equipment that, in operation, renders the sequence of XR images that is to be shown to the user of the display apparatus.

Optionally, the at least one image renderer is implemented by way of at least one display. In such a case, the term "display" used herein refers to equipment configured to display a given XR image. Notably, the given image is displayed at an image rendering surface (for example, such as a display layer or display screen) of the at least one display. Optionally, the at least one display is selected from the group consisting of: a Liquid Crystal Display (LCD), a Light Emitting Diode (LED)-based display, an Organic LED (OLED)-based display, a micro OLED-based display, a Liquid Crystal on Silicon (LCoS)-based display, and a Cathode Ray Tube-based display.

Optionally, the at least one image renderer is implemented by way of at least one projector and a projection screen associated therewith. In such a case, the projection screen acts as an image rendering surface upon which the at least one projector projects a given XR image. Optionally, the at least one projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

It will be appreciated that the display apparatus (and optionally, the at least one image renderer) may not necessarily provide a field of view that is exactly perpendicular (namely, straight ahead) but the field of view could be tilted in order to provide a wide stereo overlap area for binocular human vision.

Optionally, the field of view providable by the display apparatus depends on an angular size of the field of view providable by the at least one image renderer. In some implementations where the display apparatus comprises a single image renderer, the field of view providable by the display apparatus depends on an angular size of a field of view providable by said image renderer. In other implementations where the display apparatus comprises a plurality of image renderers, a stereo field of view providable by the display apparatus depends on angular sizes of fields of view providable by the plurality of image renderers.

Throughout the present disclosure, the phrase "angular size of the field of view providable by the at least one image renderer" refers to an angular size (namely, an angular extent or a field of view) of a given image that can be rendered at the at least one image renderer. Notably, the angular size of the field of view providable by the at least one image renderer is measured with respect to the user's eyes or an imaginary point from where the user would apparently view the given image rendered by the at least one image renderer. It will be appreciated that the angular size of the field of view providable by the at least one image renderer is fixed (namely, constant). Notably, said angular size is defined by physical attributes of the at least one image renderer, and is known for a given model and type of the display apparatus. Moreover, the angular size of the field of view providable by the at least one image renderer corresponds to an angular size of a field of view providable by a viewport of the display apparatus. Herein, the term "viewport" refers to an area of the display apparatus that is employed for displaying the given image.

Optionally, an angular size of a field of view providable by an image renderer of the display apparatus lies in a range of 60 degrees to 180 degrees. In an example, the angular size of a field of view providable by one image renderer of the display apparatus may be equal to 90 degrees. In another example, an angular size of fields of view providable by two image renderers (for a left eye and a right eye of the user) of the display apparatus may be equal to 90 degrees, wherein the fields of view of the two image renderers overlap partially to collectively provide a stereo field of view equal to 106 degrees.

Throughout the present disclosure, the term "processor" refers to hardware, software, firmware or a combination of these. The at least one processor of the imaging system controls operation of the imaging system. It will be appreciated that the term "at least one processor" refers to "one processor" in some implementations, and "a plurality of processors" in other implementations.

Throughout the present disclosure, the term "camera" refers to an equipment that is operable to detect and process light from the real-world environment, so as to capture the at least one input image of the real-world environment. In an embodiment, the at least one camera is implemented as at least one video see-through camera. Optionally, the at least one camera comprises a camera chip, wherein the light from the real-world environment is directed by at least one optical element onto a photosensitive surface of the camera chip, thereby enabling the at least one camera to capture the at least one input image of the real-world environment. Optionally, the at least one optical element comprises at least one lens of the at least one camera. Examples of the at least one lens may include, but are not limited to, a fish-eye lens, a rectilinear lens. The real-world environment could be an indoor real-world environment, an outdoor real-world environment, or a combination of these. Notably, a given input image represents the captured region of the real-world environment. In an example, the given input image may represent a room with a man sitting on a chair.

Optionally, the at least one camera is at least one of: a digital camera, an RGB-D camera, a Light Detection and Ranging (LiDAR) camera, a Time-of-Flight (ToF) camera, a laser rangefinder, a stereo camera.

Moreover, optionally, the at least one camera is implemented as at least one of: a visible-light camera, a hyperspectral camera, a monochrome camera, a multispectral color filter camera, an infrared (IR) camera, an event camera.

When the at least one input image is captured by the at least one camera, the spatial distortion is introduced to the least one input image. Said distortion may be introduced due to optical properties and/or arrangement of components (the at least one optical element (such as, a wide-angle lens or a fish-eye lens), the camera chip, and the like) of the at least one camera, closeness of a targeted region and the at least one camera, and many other factors.

Herein, the term "spatial distortion" refers to an optical aberration, wherein straight lines in the at least one input image are deformed and/or bent that makes the straight lines appear curved in the at least one input image. Optionally, the spatial distortion is introduced as a deformation along the straight lines by a factor of increase or decrease of two degrees. Optionally, the spatial distortion is a barrel distortion (namely, a fish-eye distortion). Alternatively, optionally, the spatial distortion is a pincushion distortion. It will be appreciated that the barrel distortion is usually preferred by humans over the pincushion distortion, as the pincushion distortion is sensed as unnatural.

The at least one processor generates the at least one intermediate image by correcting the spatial distortion of the at least one input image. It will be appreciated that within the given intermediate image, a resolution of the given intermediate image is higher at its centre as compared to its edges. Herein, the term "resolution" refers to number of pixels per degree (namely, points per degree (PPD)) of a given region of a given image. In simpler terms, the term "resolution" refers to visual detail that the given image holds. Herein, the term "resolution" encompasses "angular resolution".

It will be appreciated that when the field of view of the at least one camera is optimized to obtain a high resolution at a centre of the at least one intermediate image, of the at least one intermediate image is generated in a manner that some regions of the at least one intermediate image do not represent any visual information of the real-world environment.

Optionally, when correcting the spatial distortion of the at least one input image, the at least one processor is configured to employ at least one spatial distortion correction model. In this regard, the at least one lens of the at least one camera is calibrated to fit the at least one spatial distortion correction model. This fitting is done iteratively using non-linear optimization methods. Firstly, initial spatial distortion parameters are estimated and then an optimization algorithm is employed to optimize the initial spatial distortion parameters with camera parameters based, for example, on a least-squares method. Optionally, the at least one spatial distortion correction model is at least one of: a Brown-Conrady model, a rational function lens distortion model, a field of view (FOV) model, a division model, a cubic rational polynomial model. Once parameters of the at least one spatial distortion correction model are known, an inverse function is applied iteratively to the at least one input image.

Optionally, for a given input image, the at least one processor is configured to generate single intermediate image. Alternatively, optionally, for a given input image, the at least one processor is configured to generate multiple intermediate image.

Optionally, when generating the at least one intermediate image, the at least one processor is configured to crop the at least one input image. Notably, a field of view of a given input image may be greater than a field of view of the at least one image renderer of the display apparatus. In such a case, the at least one processor is configured to crop the given input image to match the field of view of the given input image with the field of view of the at least one image renderer.

It will be appreciated that the correction of the spatial distortion and the cropping of the at least one input image can be performed in any order. In some implementations, the spatial distortion is corrected after cropping a given input image. In other implementations, the spatial distortion is corrected prior to cropping the given input image. It will also be appreciated that the technical benefit of correcting the spatial distortion prior to cropping the given input image is that a same correction function can be applied to a sequence of input images. Moreover, this is particularly beneficial in a case where the cropping (namely, a region to be cropped) depends on a gaze direction of a user.

It will be appreciated that when the spatial distortion is corrected after cropping a given input image, the given input image is cropped to generate an intermediate image, and the spatial distortion is corrected for said intermediate image to generate a next intermediate image. However, when the spatial distortion is corrected prior to cropping a given input image, the spatial distortion of the given input image is corrected to generate an intermediate image, and said intermediate image is cropped to generate a next intermediate image.

The given intermediate image comprises the capturing region and the plurality of non-capturing regions. The term "capturing region" refers to a region of the given intermediate image that represents visual information of the real-world environment. The capturing region of the given intermediate image corresponds to the captured region of the real-world environment that is represented in the given input image.

The term "non-capturing region" refers to a region of the given intermediate image that does not represent any visual information of the real-world environment. In other words, the non-capturing region corresponds to a non-captured region (namely, a region that is not captured by the at least one camera) of the real-world environment. In such a case, the plurality of non-capturing regions would be represented as missing and/or obliterated visual information of the given intermediate image.

Notably, the plurality of non-capturing regions of the given intermediate image are neighbouring to (namely, adjacent to) the capturing region of the given intermediate image. Notably, the non-capturing regions of the given intermediate image are represented as black occluded regions in the given intermediate image as visual information pertaining to the non-capturing regions is unavailable.

Optionally, a given non-capturing region is located at a periphery of the given intermediate image. In an example, there may be two non-capturing regions on two adjacent sides (namely, edges) within the given intermediate image. A first non-capturing region may be located along a top side of the given intermediate image, whereas a second non-capturing region may be located along a right side of the given intermediate image. In another example, there may be four non-capturing regions, each located along one of four edges of the given intermediate image. In yet another example, when a user's gaze may be directed towards a right top side, a given input image may be cropped from the right top side to generate a given intermediate image. Herein, there may be two non-capturing regions of the given intermediate image, one non-capturing region along a top edge, and another non-capturing region along a right edge.

Moreover, optionally, a size of the given non-capturing region of the given intermediate image is smaller than a size of the capturing region of the given intermediate image. Optionally, a size of the given non-capturing region lies in a range of a few tens of rows and/or columns to a few hundreds of rows and/or columns. Optionally, a number of pixels in the given non-capturing region lies in range of 100 pixels to 100000 pixels. It will be appreciated that the number of pixels in the given non-capturing region could optionally be lesser than 100 pixels or greater than 100000 pixels.

Optionally, the at least one processor is further configured to highlight the plurality of non-capturing regions of the given intermediate image. It will be appreciated that the plurality of non-capturing regions would be distinctly identifiable in the given intermediate image through said highlighting. Optionally, in this regard, the plurality of non-capturing regions are highlighted using a specific colour. As an example, the plurality of non-capturing regions may be highlighted using white colour.

The term "image data" refers to data pertaining to visual information of a given region of the given intermediate image, which encompasses not only colour information represented in the given region of the given intermediate image, but also other attributes associated with the given region of the given intermediate image (for example, such as depth information, transparency information, and the like).

Optionally, the image data for a given region of the given intermediate image comprises at least one of: pixel values (intensities) of pixels of the given region, depth values of pixels of the given region, transparency values of pixels of the given region. Notably, the image data for the plurality of non-capturing regions of the given intermediate image are required to be generated by the at least one processor, whereas the image data for the capturing region of the given intermediate image is available (as such image data is captured by the at least one camera whilst imaging the real-world environment).

Optionally, the image data for the given non-capturing region of the given intermediate image comprises at least one of: pixel values of pixels of the given non-capturing region, depth values of pixels of the given non-capturing region, transparency values of pixels of the given non-capturing region. Likewise, optionally, the image data for the capturing region of the given intermediate image comprises at least one of: pixel values of pixels of the capturing region, depth values of pixels of the capturing region, transparency values of pixels of the capturing region.

Optionally, the at least one processor is configured to generate the image data for the given non-capturing region of the given intermediate image in a manner that the missing and/or obliterated parts of the given intermediate image are reconstructed (namely, restored or filled in). Optionally, when generating the image data for the given non-capturing region of the given intermediate image, the at least one processor is configured to employ at least one of: an inpainting algorithm, an image conservation algorithm, an image reconstruction algorithm, a computer vision algorithm, an artificial intelligence algorithm.

Optionally, when generating the image data for the given non-capturing region of the given intermediate image, the at least one processor is configured to employ at least one inpainting algorithm.

Optionally, the at least one inpainting algorithm is at least one of: a Fast Marching Method (FMM) algorithm, a Navier Stokes (NS) based inpainting algorithm, a coherence transport based inpainting algorithm, an exemplar-based inpainting algorithm, Criminisi's algorithm, a group-based sparse representation (GSR) algorithm, a compression-oriented edge-based inpainting algorithm, an annihilating filter-based low-rank Hankel matrix approach (ALOHA) algorithm, an image melding using patch-based synthesis algorithm. In an example, the at least one processor may employ the coherence transport based inpainting algorithm, which is a pixel-based approach for removing objects and filling regions in images. Herein, inpainting is performed inwards starting from the boundary pixels of the non-capturing region of a given image. In such a case, inpainting value for a pixel of the non-capturing region is estimated from its coherent neighbouring pixels with known values.

Next, there will now be described various basis on which the image data for the given non-capturing region of the given intermediate image may be generated.

Optionally, when generating the image data for the given non-capturing region of the given intermediate image, the at least one processor is configured to utilize the information pertaining to the virtual object that is to be virtually superimposed over at least a portion of the given non-capturing region. Herein, the term "virtual object" refers to a computer-generated object. Examples of the virtual object include, but are not limited to, a virtual navigation tool (such as a virtual map, a virtual direction signage, and so forth), a virtual gadget (such as a virtual calculator, a virtual computer, and so forth), a virtual message (such as a virtual instant message, a virtual chat conversation, a virtual to-do note, and so forth), a virtual entity (such as a virtual person, a virtual animal, a virtual ghost, and so forth), a virtual entertainment media (such as a virtual painting, a virtual video, a virtual interactive advertisement, and so forth), and a virtual information (such as a virtual news description, a virtual announcement, virtual data, and so forth).

Optionally, the information pertaining to the virtual object comprises at least one of: a plurality of pixel values (namely, intensities) of pixels corresponding to the virtual object, a plurality of depth values of pixels corresponding to the virtual object, a plurality of transparency values of pixels corresponding to the virtual object. Notably, the pixel value of a given pixel is indicative of a brightness of the given pixel and a color of the given pixel. The pixel values of pixels corresponding to the virtual object are indicative of the brightness and the color of the virtual object. Optionally, pixel values for at least some pixels corresponding to the given non-capturing region of the given intermediate image are generated to be same as pixel values of pixels corresponding to the virtual object. Optionally, the virtual object is to be fully superimposed over the given non-capturing region of the given intermediate image. In such a case, pixel values for all pixels corresponding to the given non-capturing region of the given intermediate image are generated to be same as pixel values of pixels corresponding to the virtual object. Alternatively, optionally, the virtual object is to be partially superimposed over the given non-capturing region of the given intermediate image. In such a case, pixel values for some pixels corresponding to the given non-capturing region of the given intermediate image are generated to be same as pixel values of pixels corresponding to the virtual object. Herein, pixel values for other pixels corresponding to the given non-capturing region of the given intermediate image are either estimated based on available pixel values of pixels corresponding to the virtual object or estimated based on other basis of the image data generation.

In an example, there may be a virtual toy that is to be virtually superimposed fully over the given non-capturing region of the given intermediate image. Herein, pixel values (namely, intensities) of all pixels corresponding to the virtual toy may be '496', and such pixels would have a 'turquoise' color and 65.9 percent brightness (according to a scale where black color has 0 percent brightness and white color has 100 percent brightness). Herein, pixel values for all pixels corresponding to the given non-capturing region of the given intermediate image may be equal to '496'.

Optionally, when generating the image data for the given non-capturing region of the given intermediate image, the at least one processor is configured to utilize the portion of the capturing region neighbouring the given non-capturing region. Optionally, in this regard, the image data for the given non-capturing region of the given intermediate image is generated based on image data of the portion of the capturing region neighbouring the given non-capturing region. It will be appreciated that the image data of the portion of the capturing region is already accurately known to the at least one processor. As an example, the pixel values of pixels corresponding to the given non-capturing region are estimated from pixel values of neighbouring pixels of the portion of the capturing region. Optionally, the neighbouring pixels of the portion of the capturing region are utilized to make the given non-capturing region of the given intermediate image appear seamless and continuous with the capturing region. In such a case, a given XR image that is subsequently produced would be realistic and immersive. Therefore, when a user views the given XR image, the user experiences realism and immersiveness within an XR environment.

In an example, there may be a light blue glass table in a given capturing region neighbouring a given non-capturing region of a given intermediate image. In such a case, pixel values of pixels and transparency values of pixels corresponding to the given non-capturing region are estimated from pixel values of pixels and transparency values of pixels corresponding to the light blue glass table in the given capturing region.

Optionally, when generating the image data for the given non-capturing region of the given intermediate image, the at least one processor is configured utilize the at least one previous XR image. Optionally, in this regard, the image data for the given non-capturing region of the given intermediate image is generated based on image data of the at least one previous XR image. It will be appreciated that the image data of the at least one previous XR image is already accurately known to the at least one processor. In an example, pixel values for pixels corresponding to the given non-capturing region of the given intermediate image are estimated from pixel values of pixels corresponding to a corresponding region in the at least one previous XR image. In this way, the given non-capturing region of the given intermediate image would be consistent with the corresponding region of the at least one previous XR image. Optionally, when generating the image data, the at least one processor is configured utilize the at least one previous XR image that had been generated in a recent (previous) time period. Optionally, a given recent time period lies in a range of 0.001 milliseconds (or 1 microsecond) to 1000 milliseconds (or 1 second). For example, the given recent time period may be from 0.001, 0.01, 0.1, 0.25, 0.5, 0.75, 1, 100, 200, 300, 400, 500, 600, 700, 800, or 900 milliseconds up to 0.01, 0.1, 0.25, 0.5, 0.75, 1, 100, 200, 300, 400, 500, 600, 700, 800, 900, or 1000 milliseconds.

It will be appreciated that utilizing the at least one previous XR image, when generating the image data, provides more accurate image data for static objects. It will also be appreciated that as frame rate of generating XR images is generally high (such as, above 60 frames per second), there is a likelihood that visual information pertaining to the at least one previous XR image would be relevant to the given intermediate image.

Optionally, when generating the image data for the given non-capturing region of the given intermediate image, the at least one processor is configured to utilize the photogrammetric model of the real-world environment. Optionally, the photogrammetric model assists in providing a realistic estimation of the image data for the given non-capturing region of the given intermediate image, based on details of the real-world environment. In an example, pixel values of the pixels corresponding to the given non-capturing region of the given intermediate image are estimated from pixel values of the pixels corresponding to same region in the photogrammetric model of the real-world environment.

Herein, the term "photogrammetric model" refers to a data structure representative of a given real-world environment in which the display apparatus is to be used. In order to generate the photogrammetric model of the real-world environment, images of the real-world environment are captured and analyzed to obtain information pertaining to the real-world environment. Optionally, the photogrammetric model of the real-world environment comprises information indicative of at least one of: optical depths of objects within the real-world environment with respect to camera(s) that capture images indicative of the optical depths, features of the objects detected from the captured images of the real-world environment, physical shapes of objects that are determined based on processing the optical depth information and the features of the objects, materials of the objects or their portions, information regarding lights and lighting conditions (such as brightness, darkness, shadowing, and the like) within the real-world environment.

In an example, there may be a portion of the capturing region neighbouring the given non-capturing region of the given intermediate image with a light source therein. In such a case, when generating the image data for the given non-capturing region, brightness values of the pixels corresponding to the given non-capturing region are estimated from the brightness values of the pixels corresponding to same region in the photogrammetric model of the real-world environment.

Optionally, the at least one camera of the imaging system is configured to capture the images (of the real-world environment) that are used for generating the photogrammetric model of the real-world environment.

Optionally, the at least one processor is configured to generate the photogrammetric model of the real-world environment. Optionally, the at least one processor is configured to generate the photogrammetric model of the real-world environment prior to, or at a start of an XR session.

In an embodiment, the photogrammetric model of the real-world environment is not updated during the XR session. In another embodiment the photogrammetric model of the real-world environment is dynamically updated during the XR session. Optionally, the at least one processor is further configured to dynamically update the photogram metric model of the real-world environment based on produced XR images during the XR session. Optionally, the at least one processor is configured to periodically update the photogrammetric model of the real-world environment. For example, the photogrammetric model of the real-world environment may be updated after every 10 minutes. Alternatively, optionally, the at least one processor is configured to intermittently update the photogrammetric model of the real-world environment. For example, the photogrammetric model of the real-world environment may be updated after 10 minutes, and then again updated after 30 minutes. Yet alternatively, optionally, the at least one processor is configured to update the photogrammetric model of the real-world environment based on user-input.

Optionally, when processing the given intermediate image to produce the given XR image, the at least one processor is configured to apply image data generated for the plurality of non-capturing regions of the given intermediate image to the plurality of non-capturing regions of the given intermediate image. In other words, local inpainting of the plurality of non-capturing regions of the given intermediate image is performed according to the generated image data, to produce the given XR image. The given XR image so produced is immersive, realistic, and rich in terms of image data (as image data is available for the entirety of the given XR image). As the image data for the plurality of non-capturing regions of the given intermediate image is unavailable, the at least one processor is accurately and intelligently generates the image data for said non-capturing regions, and also applies the image data to said non-capturing regions to produce the given XR image.

It will be appreciated that upon applying the image data for the given non-capturing region of the given intermediate image, the field of view of the given intermediate image would be filled-in (namely, inpainted) with the generated image data to represent visual information in an entirety of the given intermediate image. In this way, the field of view of the given intermediate image would be expanded by addition of missing visual information therein. The given XR image produced using the given intermediate image would be optimal according to the field of view of the at least one image renderer of the display apparatus, and would therefore be optimally rendered at the display apparatus.

Optionally, the at least one processor is configured to digitally superimpose at least one virtual object over the at least a portion of the given non-capturing region of the given intermediate image when processing the given intermediate image to generate the given XR image.

In an embodiment, the at least one processor is configured to digitally superimpose at least one virtual object over the at least a portion of the given non-capturing region of the given intermediate image at a time of processing the given intermediate image.

In another embodiment, the at least one processor is configured to digitally superimpose at least one virtual object over the at least a portion of the given non-capturing region of the given intermediate image at a time of generating the given intermediate image.

Optionally, the at least one input image comprises a first image and a second image that have been captured contemporaneously, and the at least one intermediate image comprises a first intermediate image and a second intermediate image generated from the first image and the second image, respectively, wherein, when generating the image data, the at least one processor is configured to generate image data for a given non-capturing region of one of the first intermediate image and the second intermediate image, based on a corresponding portion of a capturing region of other of the first intermediate image and the second intermediate image.

In this regard, a field of view of the first image is offset from a field of view of the second image. In other words, the first image is captured with respect to a perspective of the first eye of the user, while the second image is captured with respect to a perspective of the second eye of the user. The first image and the second image represent offset views of the real-world environment. As the first image and the second image are captured contemporaneously, they represent the real-world environment at the same time.

Optionally, the first image and the second image are captured contemporaneously using a single camera. Alternatively, optionally, the first image and the second image are captured contemporaneously using a plurality of cameras.

Optionally, the first intermediate image is generated by correcting spatial distortion of the first image, while the second intermediate image is generated by correcting spatial distortion of the second image.

Optionally, the at least one processor is configured to:
generate image data for a given non-capturing region of the first intermediate image, based on a corresponding portion of a capturing region of the second intermediate image; and/or generate image data for a given non-capturing region of the second intermediate image, based on a corresponding portion of a capturing region of the first intermediate image.

In this regard, when generating the image data for the given non-capturing region of the first intermediate image, captured image data for the capturing region of the second intermediate image is utilized. It will be appreciated that the captured image data for the capturing region of the second intermediate image is already known and accurately known to the at least one processor. Likewise, when generating the image data for the given non-capturing region of the second intermediate image, captured image data for the capturing region of the first intermediate image is utilized. It will be appreciated that the captured image data for the capturing region of the first intermediate image is already known and accurately known to the at least one processor.

In an example, there may be a real-world environment having five objects Z1, Z2, Z3, Z4, and Z5 arranged therein. A first input image may represent three objects Z1, Z2, and Z3 fully, and one object Z4 partially. A second input image may represent three objects Z3, Z4, and Z5 fully. Herein, a first intermediate image may be generated from the first input image and a second intermediate image may be generated from the second input image. A portion of a capturing region of the first intermediate region would correspond to the object Z4. Image data for a non-capturing region neighbouring said portion of the capturing region is generated by utilizing captured image data of a portion of a capturing region of the second intermediate region that corresponds to the object Z4.

Optionally, the at least one processor is further configured to process the first intermediate image and the second intermediate image, based on the generated image data, to produce a first XR image and a second XR image to be presented at the display apparatus. Optionally, when processing the first intermediate image and the second intermediate image to produce the first XR image and the second XR, respectively, the at least one processor is configured to apply the image data generated for plurality of non-capturing regions of the first intermediate image and the second intermediate image to plurality of non-capturing regions of the first intermediate image and the second intermediate image, respectively. Herein, the "first XR image" and the "second XR image" refer to XR images that are generated from the first intermediate image and the second intermediate image, respectively, upon processing (for example, by inpainting) of the first intermediate image and the second intermediate image. The first XR image is a view of an XR scene from a perspective of the first eye of the user, whereas the second XR image is a view of an XR scene from a perspective of the second eye of the user. The first XR image and the second XR image constitute a stereo XR image pair for the user's eyes.

Optionally, in this regard, the display apparatus comprises a first image renderer and a second image renderer, wherein the first image renderer is configured to render the first XR image and the second image renderer is configured to render the second XR image.

Optionally, when generating the image data, the at least one processor is configured to utilize in a decreasing order of priorities:
the information pertaining to the virtual object,
the neighbouring portion of the capturing region of the given intermediate image,
the corresponding portion of the capturing region of the other of the first intermediate image and the second intermediate image,
the at least one previous extended-reality image,
the photogrammetric model of the real-world environment.

It will be appreciated that the at least one processor is optionally configured to utilize at least one of the aforesaid criteria in the aforesaid decreasing order of priorities, to generate image data for the given non-capturing region of the given intermediate image. Notably, different criteria facilitate generation of the image data with different accuracies, different processing complexities, different processing times, and the like. The aforesaid decreasing order of priorities lists various criteria in a specific order for maximizing accuracy of the generated image data, minimizing utilization of processing resources that are employed for generating the image data, and minimizing processing time when generating the image data.

Technical benefits arising out of utilizing the information pertaining to the virtual object as a highest-priority criterion for generating the image data are high accuracy of the image data and low processing time for generating the image data, as the information pertaining to the virtual object is already known and accurately known to the at least one processor. Technical benefits arising out of utilizing the neighbouring portion of the capturing region of the given intermediate image as a second-highest-priority criterion for generating the image data are high accuracy of the image data. This can be attributed to the fact that utilizing the neighbouring portion of the capturing region of the given intermediate image to generate the image data provides a realistic and accurate estimation of the image data. The image data so generated ensures a smooth transition between the capturing region and the non-capturing region of the given intermediate image. This leads to a seamless and a continuous appearance of the given XR image. The given XR image would be realistic and immersive. Technical benefits arising out of utilizing the corresponding portion of the capturing region of the other of the first intermediate image and the second intermediate image as a third-highest-priority criterion for generating the image data are high accuracy of the image data. As the image data generated for the given non-capturing region is obtained from captured image data in the corresponding portion of the capturing region of the other of the first intermediate image and the second intermediate image, the generated image data is highly accurate. Moreover, this manner of generating image data involves low utilization of processing resources for generating the image data, and low processing time for generating the image data. Technical benefits arising out of utilizing the at least one previous XR image as a fourth-highest-priority criterion for generating the image data are low processing time for generating the image data, and high accuracy of the image data as image data of the at least one previous XR image is already accurately known to the at least one processor. Moreover, the accuracy of the image data would especially be high in case of stationary objects within a given real-world environment scene. Technical benefits arising out of utilizing the photogrammetric model of the real-world environment as a fifth-highest-priority criterion for generating the image data are good accuracy of the image data as the photogrammetric model assists in providing a realistic estimation of the image data based on details of the real-world environment.

Optionally, the at least one processor is configured to obtain, from the display apparatus, information indicative of a gaze direction of a user, wherein, when generating the at least one intermediate image, the at least one processor is configured to select a region of the at least one input image for cropping, based on the gaze direction of the user.

Optionally, the display apparatus comprises a means for detecting the gaze direction of the user. Said means, in operation, detects the gaze direction of the user. Optionally, in this regard, the at least one processor is communicably coupled to the means for detecting the gaze direction of the user. Throughout the present disclosure, the term "means for detecting the gaze direction" refers to a specialized equipment for detecting and/or following a direction of gaze of the user of the display apparatus, when said user views a sequence of XR images using the display apparatus. Notably, the gaze direction of the user is detected when the display apparatus in operation is worn by the user. Optionally, the means for detecting the gaze direction is implemented by way of contact lenses with sensors, cameras monitoring the position of the pupil of the user's eye, and the like. Such means for detecting the gaze direction are well-known in the art. Beneficially, the means for detecting the gaze direction is arranged in a manner that said means does not cause any obstruction in an optical path of projections of the sequence of XR images.

Optionally, the means for detecting the gaze direction is configured to measure eye-tracking data and process the eye-tracking data to generate a gaze vector indicative of the gaze direction of the user. It will be appreciated that the means for detecting the gaze direction generates the information indicative of the gaze direction of the user, said information comprising at least one of: the eye-tracking data, the gaze vector.

In an example, the gaze direction of the user may be towards a left bottom side. In such a case, when generating the at least one intermediate image, the at least one processor may be configured to select the left bottom side region of a given input image for cropping. In another example, the gaze direction of the user may be towards center. In such a case, when generating the at least one intermediate image, the at least one processor may be configured to select central region of a given input image for cropping.

Optionally, when determining the capturing region and the plurality of non-capturing regions of the given intermediate image, the at least one processor is configured to determine a size, a shape and a location of each of the plurality of non-capturing regions, wherein, when generating the image data for the given non-capturing region, the at least one processor is configured to take into account a size, a shape and a location of the given non-capturing region.

It will be appreciated that different non-capturing regions among the plurality of non-capturing regions of the given intermediate image may or may not have different sizes, shapes and locations. Herein, the size of the given non-capturing region refers to an area (namely, an extent) covered by the given non-capturing portion within the given intermediate image. The shape of the given non-capturing region may, for example, be square, rectangular, triangular, diamond, circular, semicircular, oval, elliptical, partial semi-circular, trapezoidal, annular, teardrop, plaque, cloud, star, explosion, wavy, freeform, and the like. The size of the given non-capturing region is optionally determined based on the shape of the given non-capturing region. Optionally, the location of the given non-capturing region lies along a periphery of the capturing region of the given intermediate image. In this regard, the location of the given non-capturing region may, for example, lie along an edge of the capturing region, at a corner of the capturing region, and the like.

In an example, there may be two non-capturing regions A1 and A2 within the given intermediate image. Herein, the non-capturing regions A1 and A2 may be semicircular in shape, wherein a size of the non-capturing region A1 may be greater than a size of the non-capturing region A2. Further, the non-capturing region A1 may be located along a top edge of a capturing region of the given intermediate image, whereas the non-capturing region A2 may be located along a left edge of the capturing region.

It will be appreciated that when generating the image data for the given non-capturing region, the size, the shape and the location of the given non-capturing region are very important parameters for consideration. It will also be appreciated that these parameters allow for determining an extent of the given non-capturing region. Specifically, these parameters allow for determining exact number of pixels and exact locations of pixels of the given non-capturing region for which the image data is required to be generated. Moreover, when the size, the shape and the location of the given non-capturing region is known to the at least one processor, a region to be inpainted is determined with a higher accuracy. In such a case, a given XR image that is subsequently produced would be realistic and immersive.

Optionally, the at least one processor is configured to obtain, from the display apparatus, information indicative of a gaze direction of a user, wherein the size, the shape and the location of each of the plurality of non-capturing regions is determined based on the gaze direction of the user. In this regard, the size, the shape and the location of a given non-capturing region vary according to the gaze direction of the user, as the cropping of the at least one input image is performed based on the gaze direction of the user. For different gaze directions of the user, the at least one input image would be cropped differently to generate different intermediate images, wherein a size, a shape and a location of a plurality of non-capturing regions in the different intermediate images would be different.

In an example, at an instant of time 't1', when the user's gaze is towards a right bottom side, a given input image may be cropped to generate a first intermediate image in a manner that there are two non-capturing regions (of different sizes) within the first intermediate image that may be located along a right edge of a capturing region of the first intermediate image and along a bottom edge of the capturing region. At an instant of time 't2', when the user's gaze is towards center, a given input image may be cropped to generate third intermediate image in a manner that there are four non-capturing regions (of different sizes) within the third intermediate image that may be located along a top edge of a capturing region of the second intermediate image, a right edge of the capturing region, a bottom edge of the capturing region, and a left edge of the capturing region.

Moreover, when it is determined that the gaze direction of the user lies towards a given non-capturing region, the given non-capturing region needs to be inpainted with a high accuracy. In an example, when the user's gaze is towards a right side, a given non-capturing region that is located at the right side of the given intermediate image needs to be inpainted with a high accuracy than a given non-capturing region that is located at the left side. In another example, when the user's gaze is converging (namely, both the eyes converge to see a nearby object), a given non-capturing region of the given intermediate image that is located towards the nose of the user needs to be inpainted with a high accuracy. Alternatively, when the user's gaze is diverging, inpainting would be done differently. Notably, high processing resources would be employed for generating the image data for the given non-capturing region towards which the gaze direction of the user lies. Notably, the image data for a given non-capturing region that is located away from the gaze direction of the user could either be generated with a compromised quality or not generated (namely, omitted). In such a case, low or no processing resources would be employed for generating the image data for said region.

Optionally, the at least one processor is configured to control mechanical tilting, rotating and/or shifting of a lens of the at least one camera, wherein the size, the shape and the location of each of the plurality of non-capturing regions is determined based on the mechanical tilting, rotating and/or shifting of the lens.

In this regard, the mechanical tilting, the rotating and/or the shifting of the lens of the at least one camera enables change of pose of the lens of the at least one camera. It will be appreciated that the change of pose of the lens of the at least one camera would result in matching perspective of the at least one camera with perspective of user's eyes. In such a case, the change of pose of the lens could be via translational movement and/or rotational movement. For a given pose of the lens, the at least one camera captures a given input image from a given perspective. As the pose of the lens changes, the perspective with which the at least one camera captures the given input image also changes. Notably, the plurality of non-capturing regions of the given intermediate image (that is generated using the given input image) would have a definite size, shape and location that vary according to the given pose of the lens. When pose of the lens changes, the size, the shape and the location of the plurality of non-capturing regions also changes. Therefore, as the at least one processor controls the mechanical tilting, rotating and/or shifting of the lens of the at least one camera, the processor accurately determines the shape and the location of each of the plurality of non-capturing regions based on the mechanical tilting, rotating and/or shifting of the lens.

Optionally, the lens of the at least one camera is implemented by way of a wide-angle lens, a fish-eye lens, a rectilinear lens, and the like. It will be appreciated that the lens of the at least one camera usually introduces spatial distortion when capturing the at least one input image, in order to maximize resolution at centre portion of the at least one intermediate image.

The present disclosure also relates to the method as described above. Various embodiments and variants disclosed above, with respect to the aforementioned first aspect, apply mutatis mutandis to the method.

Optionally, in the method, the at least one input image comprises a first image and a second image that have been captured contemporaneously, and the at least one intermediate image comprises a first intermediate image and a second intermediate image generated from the first image and the second image, respectively, wherein the step of generating the image data comprises generating image data for a given non-capturing region of one of the first intermediate image and the second intermediate image, based on a corresponding portion of a capturing region of other of the first intermediate image and the second intermediate image.

Optionally, in the method, the step of generating the image data comprises utilizing in a decreasing order of priorities:
the information pertaining to the virtual object,
the neighbouring portion of the capturing region of the given intermediate image,
the corresponding portion of the capturing region of the other of the first intermediate image and the second intermediate image,
the at least one previous extended-reality image,
the photogrammetric model of the real-world environment.

Optionally, in the method, the step of generating the at least one intermediate image comprises cropping the at least one input image.

Optionally, the method further comprises obtaining, from the display apparatus, information indicative of a gaze direction of a user,
wherein the step of generating the at least one intermediate image comprises selecting a region of the at least one input image for cropping, based on the gaze direction of the user.

Optionally, in the method, the step of determining the capturing region and the plurality of non-capturing regions of the given intermediate image comprises determining a size, a shape and a location of each of the plurality of non-capturing regions,
wherein the step of generating the image data for the given non-capturing region comprises taking into account a size, a shape and a location of the given non-capturing region.

Optionally, the method further comprises obtaining, from the display apparatus, information indicative of a gaze direction of a user, wherein the size, the shape and the location of each of the plurality of non-capturing regions is determined based on the gaze direction of the user.

Optionally, the method further comprises controlling mechanical tilting, rotating and/or shifting of a lens of the at least one camera, wherein the size, the shape and the location of each of the plurality of non-capturing regions is determined based on the mechanical tilting, rotating and/or shifting of the lens.

Optionally, in the method, the step of generating the image data comprises employing at least one inpainting algorithm.

DETAILED DESCRIPTION OF THE DRAWINGS

Referring to FIG. 1, illustrated is a block diagram of architecture of an imaging system 100, in accordance with an embodiment of the present disclosure. The imaging system 100 produces extended-reality images for a display apparatus 102. The imaging system 100 comprises at least one camera (depicted as a camera 104) that is employed to capture at least one input image, and at least one processor (depicted as a processor 106). The at least one input image represents a captured region of a real-world environment.

The at least one processor 106 is configured to:
generate at least one intermediate image by correcting a spatial distortion of the at least one input image;
determine a capturing region of a given intermediate image that represents the captured region of the real-world environment and a plurality of non-capturing regions of the given intermediate image that correspond respectively to a plurality of non-captured regions of the real-world environment neighboring the captured region of the real-world environment;
generate image data for a given non-capturing region of the given intermediate image, based on at least one of:
information pertaining to a virtual object that is to be virtually superimposed over at least a portion of the given non-capturing region, a portion of the capturing region neighbouring the given non-capturing region, at least one previous extended-reality image, a photogrammetric model of the real-world environment; and process the given intermediate image, based on the generated image data, to produce a given extended-reality image to be presented at the display apparatus.

Figure 2:
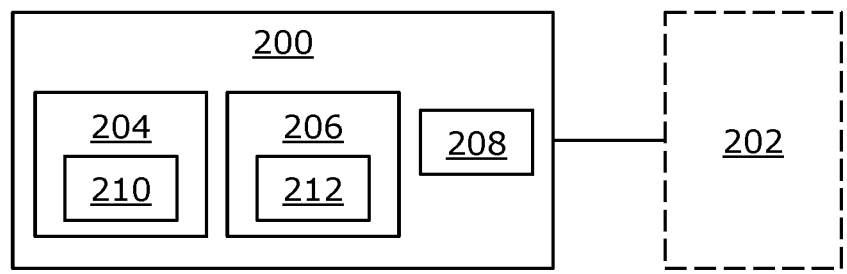

Referring to FIG. 2, illustrated is a block diagram of architecture of an imaging system 200, in accordance with another embodiment of the present disclosure. The imaging system 200 produces extended-reality images for a display apparatus 202. The imaging system 200 comprises at least one camera (depicted as cameras 204 and 206), and at least one processor (depicted as a processor 208). The cameras 204 and 206 comprise lenses 210 and 212, respectively.

It may be understood by a person skilled in the art that FIG. 1 and FIG. 2 include simplified architectures of the imaging systems 100 and 200, respectively, for sake of clarity, which should not unduly limit the scope of the claims herein. The person skilled in the art will recognize many variations, alternatives, and modifications of embodiments of the present disclosure.

Figure 3:
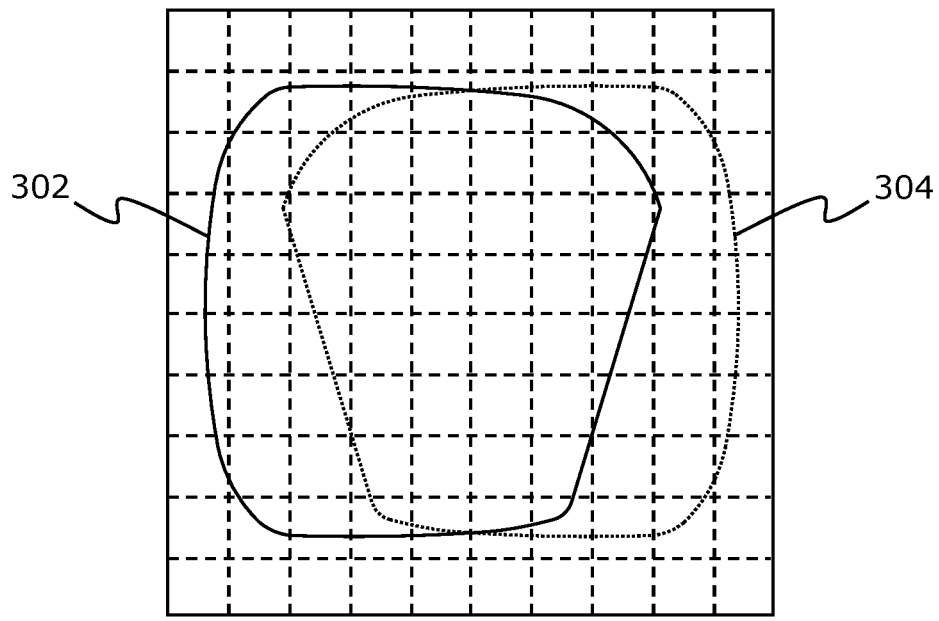
FIG. 3 illustrates viewports of a left eye and a right eye of a user of a display apparatus, in accordance with an embodiment of the present disclosure.

Referring to FIG. 3, illustrated are viewports 302 and 304 of a left eye and a right eye of a user of a display apparatus, in accordance with an embodiment of the present disclosure. The viewport 302 (depicted to be enclosed within a solid closed curve) corresponds to the left eye, whereas the viewport 304 corresponds to the right eye. The viewports 302 and 304 are associated with separate image renderers (not shown) for the left eye and the right eye. An angular size of a field of view providable by each image renderer may be, for example, 90 degrees.

Figure 4A:
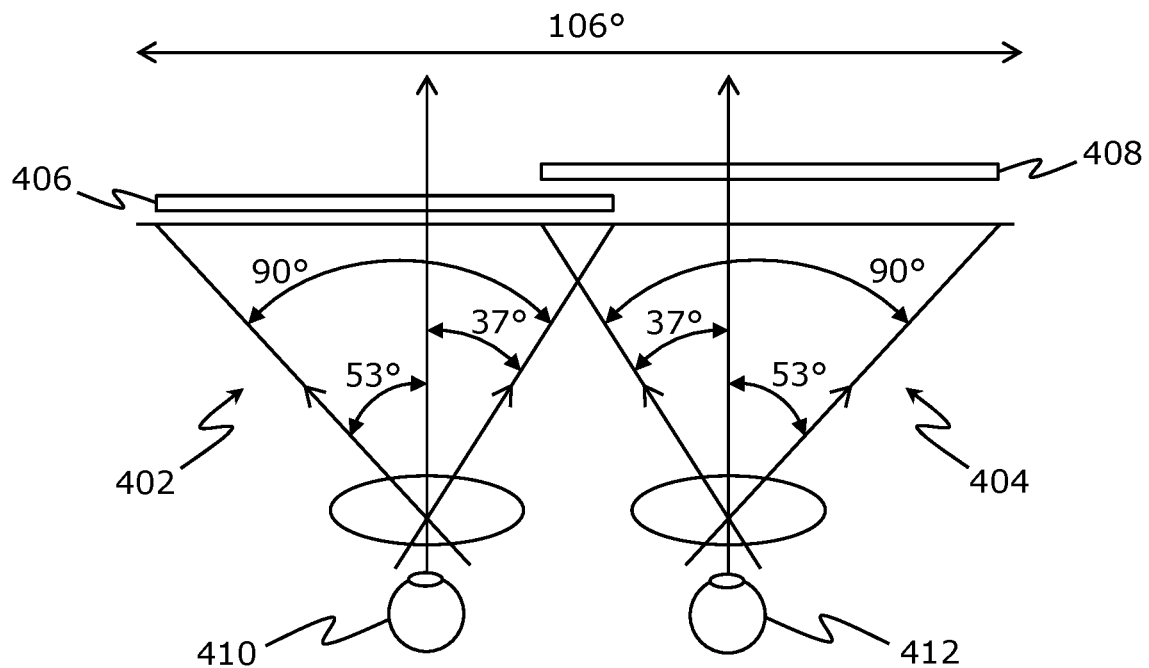
Figure 4B:
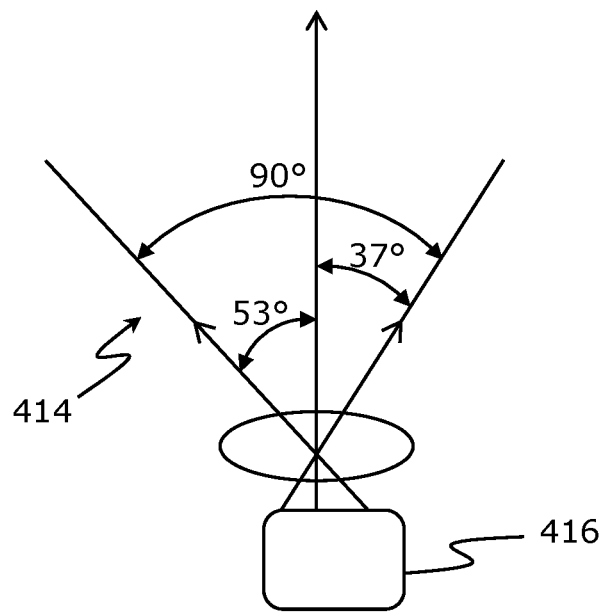
FIG. 4B illustrates a field of view of a camera used to capture a first image corresponding to the left eye, in accordance with an embodiment of the present disclosure.

Referring to FIGS. 4A and 4B, FIG. 4A illustrates fields of view 402 and 404 providable by image renderers 406 and 408 corresponding to a left eye 410 and a right eye 412, respectively, while FIG. 4B illustrates a field of view 414 of a camera 416 used to capture a first image corresponding to the left eye 410, in accordance with an embodiment of the present disclosure.

In FIG. 4A, the left eye and the right eye are shown to be looking straight, at infinity. In such a case, for example, each of the fields of view 402 and 404 providable by image renderers 406 and 408 has an angular size equal to 90 degrees. The fields of view 402 and 404 overlap partially and collectively provide a stereo field of view having an angular size equal to 106 degrees. The fields of view 402 and 404 are shown to be asymmetric with respect to gaze direction of the left eye 410 and the right eye 412, respectively. As shown, a left sector of the field of view 402 providable by the image renderer 406 associated with the left eye 410 has an angular size equal to 53 degrees, while a right sector of the field of view 402 has an angular size equal to 37 degrees. Conversely, a left sector of the field of view 404 providable by the image renderer 408 associated with the right eye 412 has an angular size equal to 37 degrees, while a right sector of the field of view 404 has an angular size equal to 53 degrees. It will be appreciated that when the left eye 410 and the right eye 412 converge to look at nearby objects, an extent of overlap of the fields of view 402 and 404 increases, to provide a stereo field of view having smaller angular size than 106 degrees.

In FIG. 4B, the field of view 414 of the camera 416 is shown to correspond to the field of view 402. The field of view 414 is also asymmetric, as is the field of view 402, thereby enabling realistic and accurate capture of the first image by the camera 416. A left sector of the field of view 414 has an angular size equal to 53 degrees, while a right sector of the field of view 414 has an angular size equal to 37 degrees.

It may be understood by a person skilled in the art that the FIGS. 4A and 4B are merely examples for sake of clarity, which should not unduly limit the scope of the claims herein. The person skilled in the art will recognize many variations, alternatives, and modifications of embodiments of the present disclosure.

Figure 5A:
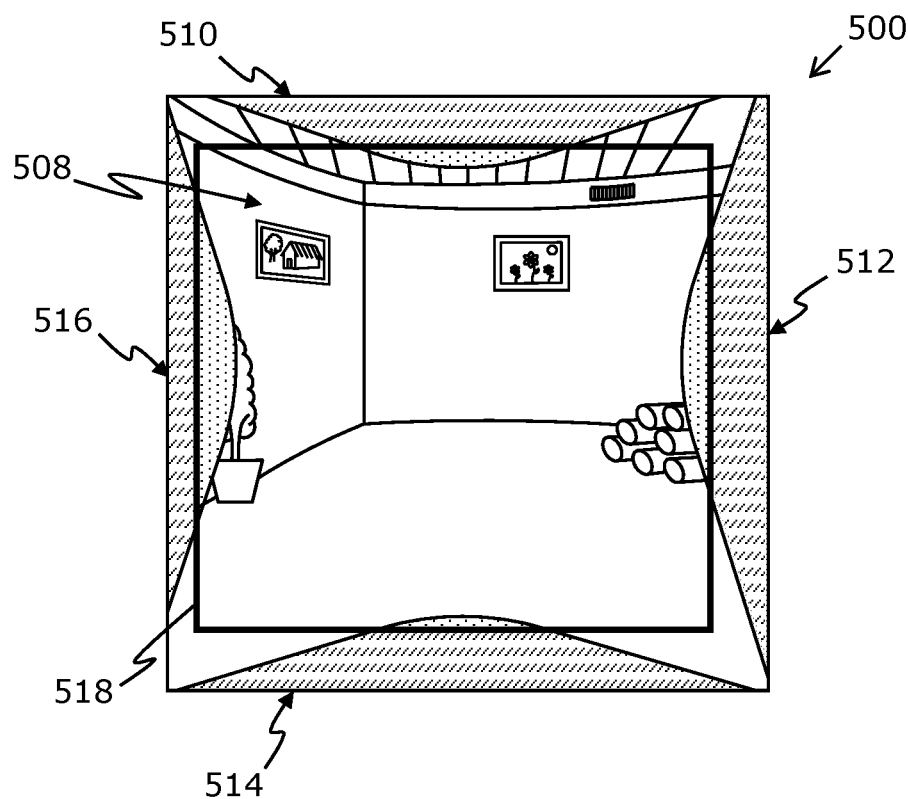
FIG. 5A illustrates a primary intermediate image.
Figure 5B:
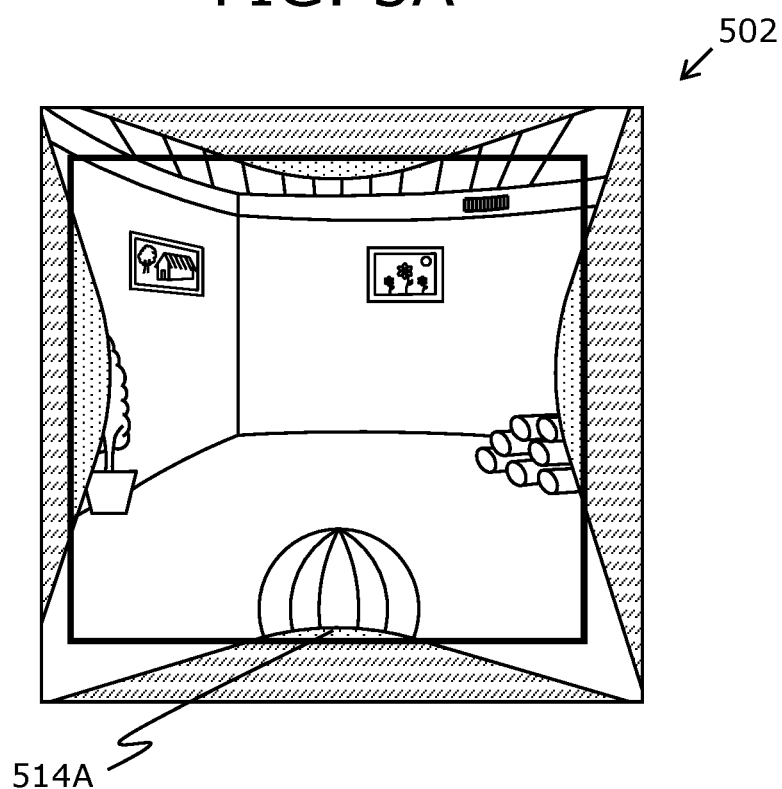
FIG. 5B illustrates a secondary intermediate image.
Figure 5C:
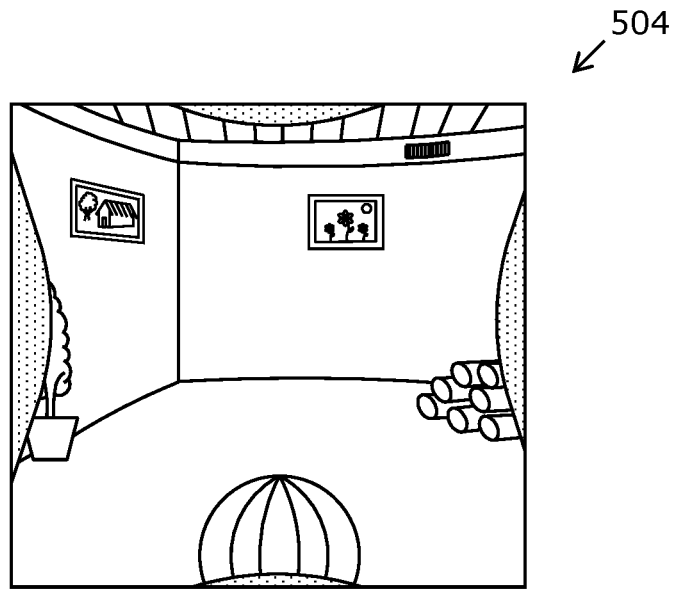
Figure 5D:
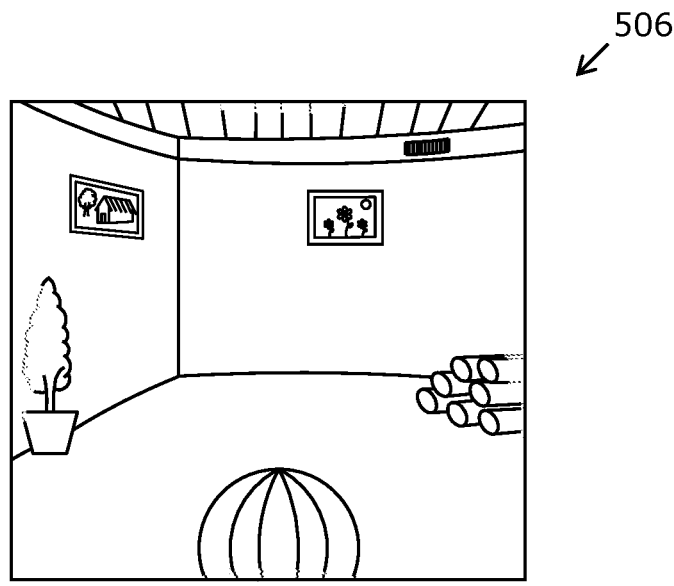
FIG. 5D illustrates an extended-reality image, in accordance with an embodiment of the present disclosure.

Referring to FIGS. 5A, 5B, 5C and 5D, FIG. 5A illustrates a primary intermediate image 500, FIG. 5B illustrates a secondary intermediate image 502, FIG. 5C illustrates a tertiary intermediate image 504, while FIG. 5D illustrates an extended-reality image 506, in accordance with an embodiment of the present disclosure.

The intermediate image 500, the secondary intermediate image 502, and the tertiary intermediate image 504, are generated when processing a given input image (not shown) to produce the extended-reality image 506.

The primary intermediate image 500 shown in FIG. 5A is generated by correcting a spatial distortion of the given input image. Therefore, the primary intermediate image 500 has a same field of view as that of the given input image. The intermediate images 500, 502, and 504 have a capturing region 508 that represents a captured region of an indoor real-world environment, as well as four non-capturing regions 510, 512, 514 and 516 that correspond respectively to four non-captured regions of the real-world environment neighboring the captured region of the real-world environment. Each non-capturing region among the four non-capturing regions 510, 512, 514 and 516 comprises a dotted hatched portion and a slashed hatched portion. A thick rectangular boundary 518 within the primary intermediate image 500 indicates an angular size of a field of view providable by an image renderer (not shown) at which the extended reality image 506 is to be rendered. The dotted hatched portions lying within the boundary 518 would be rendered at the image renderer, whereas the slashed hatched portions lying outside the boundary 518 would not be rendered at the image renderer.

The secondary intermediate image 502 shown in FIG. 5B is generated upon overlaying a virtual object (depicted as a ball) on the primary intermediate image 500 of FIG. 5A. The virtual object is shown to be overlaid on a bottom portion of the captured region 508, and a portion 514A of the non-capturing region 514 adjacent to said bottom portion.

The tertiary intermediate image 504 shown in FIG. 5C is generated upon cropping the secondary input image 502 of FIG. 5B. Said cropping may or may not be performed based on a gaze direction of a user. A field of view of the tertiary intermediate image 504 is equal to or larger than the angular size of the field of view providable by the image renderer.

The extended-reality image 506 of FIG. 5D is produced on processing the tertiary intermediate image 504 of FIG. 5C. Said processing is performed based on image data that is generated for the four non-capturing regions 510, 512, 514 and 516. As an example, image data for the non-capturing region 510 may be generated based on a photogrammetric model of the real-world environment, image data for the non-capturing region 512 may be generated based on a (right) portion of the capturing region 508 neighboring the non-capturing region 512, image data for the non-capturing region 514 may be generated based on information pertaining to the virtual object that is to be virtually superimposed over at least the portion 514A of the given non-capturing region 514, image data for the non-capturing region 516 may be generated based on at least one previous extended-reality image.

It may be understood by a person skilled in the art that the FIGS. 5A, 5B, 5C, and 5D are merely examples for sake of clarity, which should not unduly limit the scope of the claims herein. The person skilled in the art will recognize many variations, alternatives, and modifications of embodiments of the present disclosure. For example, the given input image could be cropped prior to correction of its spatial distortion, the intermediate images 500, 502 and 504 may have a different number of non-capturing regions, and the like.

Figure 6:
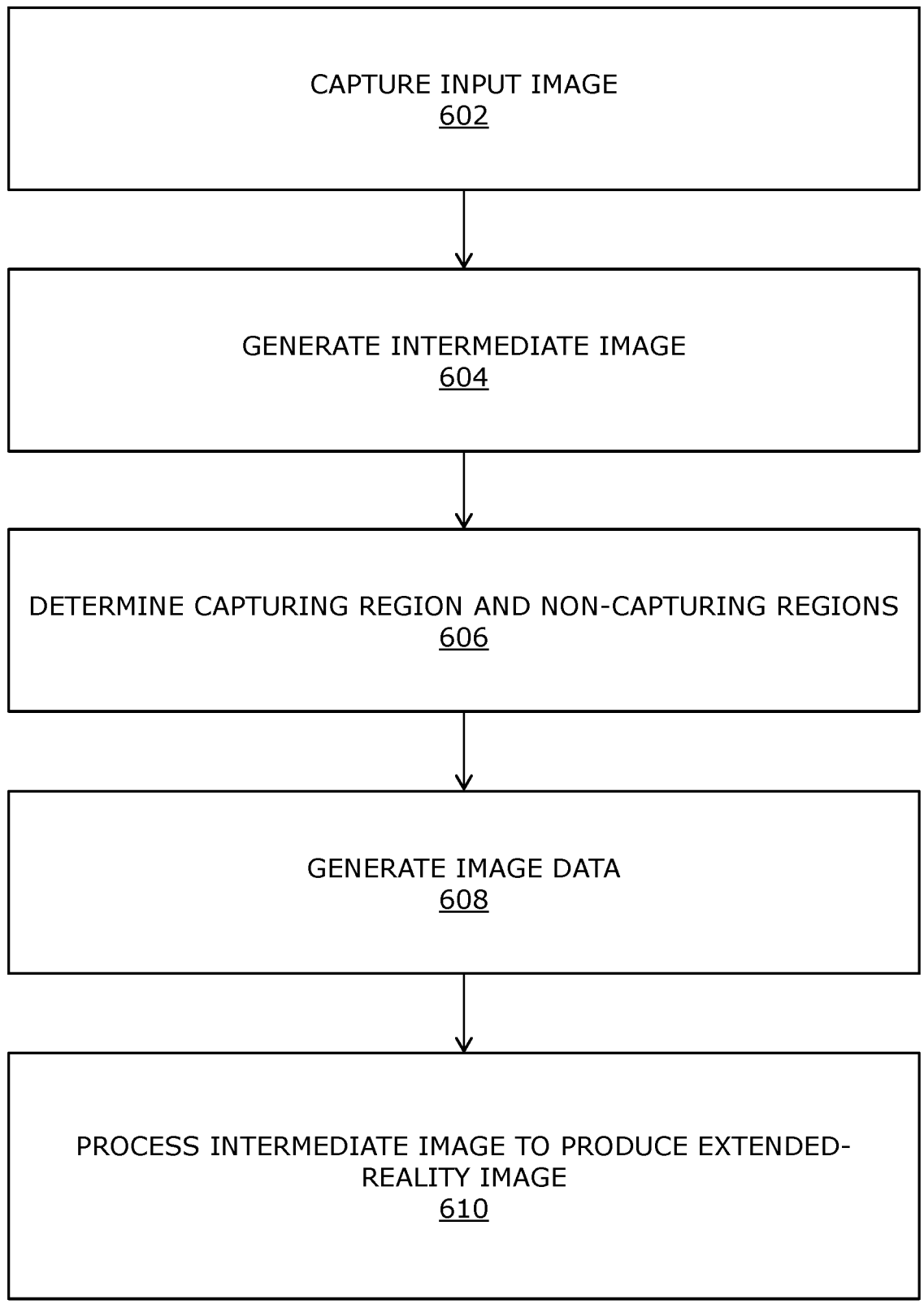
FIG. 6 illustrates steps of a method for producing extended-reality images for a display apparatus, in accordance with an embodiment of the present disclosure.

Referring to FIG. 6, illustrated are steps of a method for producing extended-reality images for a display apparatus, in accordance with an embodiment of the present disclosure. At step 602, at least one input image is captured, via at least one camera. The at least one input image represents a captured region of a real-world environment. At step 604, at least one intermediate image is generated by correcting a spatial distortion of the at least one input image. At step 606, there are determined a capturing region of a given intermediate image that represents the captured region of the real-world environment and a plurality of non-capturing regions of the given intermediate image that correspond respectively to a plurality of non-captured regions of the real-world environment neighboring the captured region of the real-world environment. At step 608, image data is generated for a given non-capturing region of the given intermediate image, based on at least one of: information pertaining to a virtual object that is to be virtually superimposed over at least a portion of the given non-capturing region, a portion of the capturing region neighbouring the given non-capturing region, at least one previous extended-reality image, a photogrammetric model of the real-world environment. At step 610, the given intermediate image is processed, based on the generated image data, to produce a given extended-reality image to be presented at the display apparatus.

The steps 602, 604, 606, 608, and 610 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An imaging system for producing extended-reality images for a display apparatus, the imaging system comprising:
    at least one camera that is employed to capture at least one input image, the at least one input image representing a captured region of a real-world environment; and
    at least one processor configured to:
        generate at least one intermediate image by correcting a spatial distortion of the at least one input image;
        determine a capturing region of a given intermediate image that represents the captured region of the real-world environment and a plurality of non-capturing regions of the given intermediate image that correspond respectively to a plurality of non-captured regions of the real-world environment neighboring the captured region of the real-world environment;
        generate image data for a given non-capturing region of the given intermediate image, based on at least one of: information pertaining to a virtual object that is to be virtually superimposed over at least a portion of the given non-capturing region, a portion of the capturing region neighbouring the given non-capturing region, at least one previous extended-reality image, a photogrammetric model of the real-world environment; and
        process the given intermediate image, based on the generated image data, to produce a given extended-reality image to be presented at the display apparatus;
    wherein the at least one input image comprises a first image and a second image that have been captured contemporaneously, and the at least one intermediate image comprises a first intermediate image and a second intermediate image generated from the first image and the second image, respectively, wherein, when generating the image data, the at least one processor is configured to generate image data for a given non-capturing region of one of the first intermediate image and the second intermediate image, based on a corresponding portion of a capturing region of other of the first intermediate image and the second intermediate image,
    and wherein when generating the image data, the at least one processor is configured to utilize in a decreasing order of priorities, at least one of:
        the neighbouring portion of the capturing region of the given intermediate image,
        the corresponding portion of the capturing region of the other of the first intermediate image and the second intermediate image,
        the at least one previous extended-reality image.

2. The imaging system of claim 1, wherein, when generating the image data, the at least one processor is configured to further utilize in a decreasing order of priorities, at least one of:
    the information pertaining to the virtual object,
    the photogrammetric model of the real-world environment.

3. The imaging system of claim 1, wherein, when generating the at least one intermediate image, the at least one processor is configured to crop the at least one input image.

4. The imaging system of claim 3, wherein the at least one processor is configured to obtain, from the display apparatus information indicative of a gaze direction of a user,
    wherein, when generating the at least one intermediate image, the at least one processor is configured to select a region of the at least one input image for cropping, based on the gaze direction of the user.

5. The imaging system of claim 1, wherein, when determining the capturing region and the plurality of non-capturing regions of the given intermediate image, the at least one processor is configured to determine a size, a shape and a location of each of the plurality of non-capturing regions, wherein, when generating the image data for the given non-capturing region, the at least one processor is configured to take into account a size, a shape and a location of the given non-capturing region.

6. The imaging system of claim 5, wherein the at least one processor is configured to obtain, from the display apparatus, information indicative of a gaze direction of a user, wherein the size, the shape and the location of each of the plurality of non-capturing regions is determined based on the gaze direction of the user.

7. The imaging system of claim 5, wherein the at least one processor is configured to control mechanical tilting, rotating and/or shifting of a lens of the at least one camera, wherein the size, the shape and the location of each of the plurality of non-capturing regions is determined based on the mechanical tilting, rotating and/or shifting of the lens.

8. The imaging system of claim 1, wherein, when generating the image data, the at least one processor is configured to employ at least one inpainting algorithm.

9. A method for producing extended-reality images for a display apparatus, the method comprising:
 capturing, via at least one camera, at least one input image representing a captured region of a real-world environment;
 generating at least one intermediate image by correcting a spatial distortion of the at least one input image;
 determining a capturing region of a given intermediate image that represents the captured region of the real-world environment and a plurality of non-capturing regions of the given intermediate image that correspond respectively to a plurality of non-captured regions of the real-world environment neighboring the captured region of the real-world environment;
 generating image data for a given non-capturing region of the given intermediate image, based on at least one of: information pertaining to a virtual object that is to be virtually superimposed over at least a portion of the given non-capturing region, a portion of the capturing region neighbouring the given non-capturing region, at least one previous extended-reality image, a photogrammetric model of the real-world environment; and
 processing the given intermediate image, based on the generated image data, to produce a given extended-reality image to be presented at the display apparatus,
 wherein the at least one input image comprises a first image and a second image that have been captured contemporaneously, and the at least one intermediate image comprises a first intermediate image and a second intermediate image generated from the first image and the second image, respectively, wherein the step of generating the image data comprises generating image data for a given non-capturing region of one of the first intermediate image and the second intermediate image, based on a corresponding portion of a capturing region of other of the first intermediate image and the second intermediate image,
 and wherein the step of generating the image data comprises utilizing in a decreasing order of priorities, at least one of:
 the neighbouring portion of the capturing region of the given intermediate image,
 the corresponding portion of the capturing region of the other of the first intermediate image and the second intermediate image,
 the at least one previous extended-reality image.

10. The method of claim 9, wherein the step of generating the image data comprises utilizing in a decreasing order of priorities, at least one of:
 the information pertaining to the virtual object,
 the photogrammetric model of the real-world environment.

11. The method of claim 9, wherein the step of generating the at least one intermediate image comprises cropping the at least one input image.

12. The method of claim 11, further comprising obtaining, from the display apparatus, information indicative of a gaze direction of a user,
 wherein the step of generating the at least one intermediate image comprises selecting a region of the at least one input image for cropping, based on the gaze direction of the user.

13. The method of any of claim 9, wherein the step of determining the capturing region and the plurality of non-capturing regions of the given intermediate image comprises determining a size, a shape and a location of each of the plurality of non-capturing regions,
 wherein the step of generating the image data for the given non-capturing region comprises taking into account a size, a shape and a location of the given non-capturing region.

14. The method of claim 13, further comprising obtaining, from the display apparatus, information indicative of a gaze direction of a user, wherein the size, the shape and the location of each of the plurality of non-capturing regions is determined based on the gaze direction of the user.

15. The method of claim 13, further comprising controlling mechanical tilting, rotating and/or shifting of a lens of the at least one camera, wherein the size, the shape and the location of each of the plurality of non-capturing regions is determined based on the mechanical tilting, rotating and/or shifting of the lens.

16. The method of claim 9, wherein the step of generating the image data comprises employing at least one inpainting algorithm.

* * * * *